United States Patent [19]
Kelmetis

[11] Patent Number: 4,617,873
[45] Date of Patent: Oct. 21, 1986

[54] BIRD CAGE WITH FOLD-DOWN TOP

[76] Inventor: George C. Kelmetis, 173 Marine St., Farmingdale, N.Y. 11735

[21] Appl. No.: 733,103

[22] Filed: May 13, 1985

[51] Int. Cl.⁴ ............................................. A01K 31/08
[52] U.S. Cl. ...................................................... 119/17
[58] Field of Search ..................................... 119/17, 18

[56] References Cited
U.S. PATENT DOCUMENTS

| 324,704 | 8/1885 | Kaiser | 119/17 |
| 2,783,738 | 3/1957 | Willeke | 119/17 |

FOREIGN PATENT DOCUMENTS 817303  7/1959  United Kingdom .................. 119/17

Primary Examiner—Hugh R. Chamblee
Attorney, Agent, or Firm—James P. Malone

[57] ABSTRACT

A cage has a rectangular bottom member and four side members. Four top members each having a truncated triangular shape are connected to the top frame. A top locking member is connected to the truncated triangular members to hold them in place when they are rotated into up position whereby the top panels can be folded down against the inside of the side panels to permit easy cleaning of the cage folded flat for shipping.

2 Claims, 3 Drawing Figures

BIRD CAGE WITH FOLD-DOWN TOP

TECHNICAL FIELD

This invention relates to cages and more particularly to bird cages wherein the top portion is adapted to be folded down for easy cleaning and shipping of the cage.

BACKGROUND

Cages such as bird cages, are generally bulky and expensive to ship due to their bulk and are also difficult to clean.

PRIOR ART

Prior Art is shown in the following U.S. Pat. Nos. 1,860,992, 1,882,142, 1,973,952, 3,352,287.

None of these show a cage with a fold-down top such as shown in the present application.

THE INVENTION

The invention comprises a cage with a fold top wherein the top comprises four truncated triangular pieces which can be folded-down for easy cleaning of the cage and wherein the four top members can be folded into flat position for easy and inexpensive shipping.

OBJECTS OF THE INVENTION

The principal object of the invention is to provide new and improved cage for birds and small animals.

Another object of the invention is to provide new and improved cage for birds and small animals which is easy and economical to ship.

Another object of the invention is to provide new and improved cage having a rectangular bottom member and four side members affixed to the bottom member, four top members each having a truncated triangular shape, each top member being connected to a top frame, the top frame being mounted on the side members, and means connected to the truncated triangular members to hold them in place when they are rotated up into position with the holding means, whereby the top panels can be folded down against the inside of the side panels to permit easy cleaning of the cage.

These and other objects of the invention will be apparent from the following specification and drawings.

BEST MODE OF THE INVENTION

Figure 1:
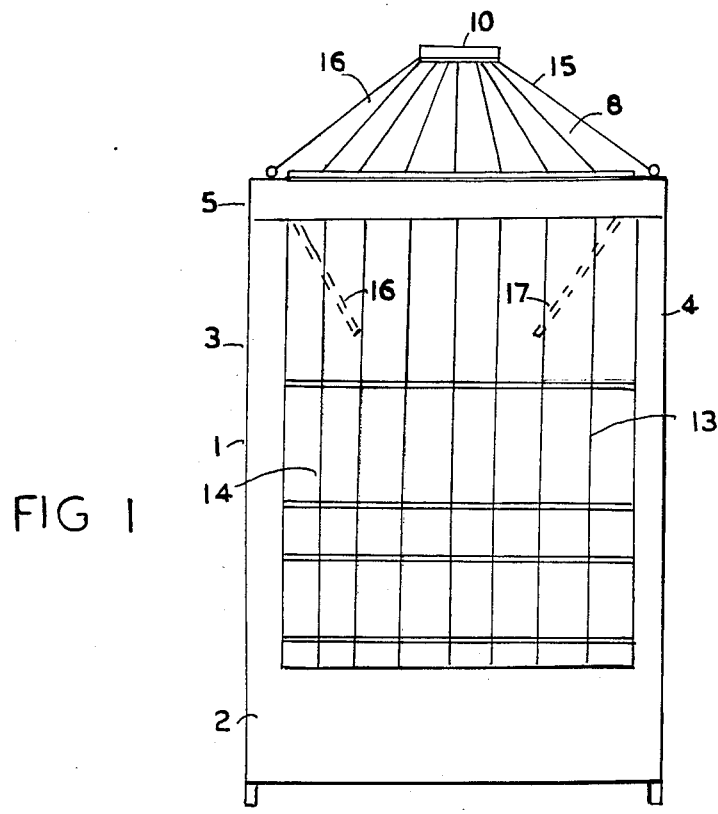
FIG. 1 is a side view of an embodiment of the invention.

Referring to the drawings, FIG. 1 shows a cage 1 having a bottom portion 2, four side members 3, 4, etc., and a top panel 5.

Four triangular members, 6, 7, 8, 9, are attached to the top panel by means of hinges 6', 7', 8', 9'. When the triangular members are folded upwardly as shown in FIG. 1, they are mounted in that position by means of the top locking member 10 with fasteners, 11, 12, etc., which may be screws or other conventional fasteners.

The four side members and the top members are open. Across the openings are mounted a plurality of cage members 13, 14, 15, 16, etc. When it is desired to clean the cage the top members are folded-down below the dotted line position 16,17, etc., as shown in FIG. 1.

Figure 2:
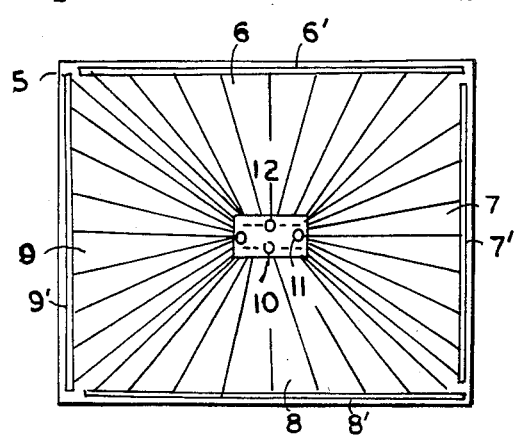
FIG. 2 is a top view of the embodiment of FIG. 1.
Figure 2A:
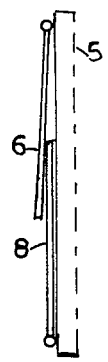
FIG. 2A is a side view of the top panel with the triangular members folded flat.

FIG. 2A shows a side view of the top panel 5 wherein the triangular members 6, 7, 8 and 9 are folded substantially flat for shipping purposes. This makes shipping more convenient and economical.

It is claimed:

1. A cage having a rectangular bottom member and four side members affixed to the bottom member,
    four flat top members each having a truncated triangular shape each top member being pivotally connected to said top frame, a top frame,
    and means connected to the truncated triangular members to hold them in place when they are rotated up
    whereby the top panels can be folded down against the inside of the side panels topermit easy cleaning of the cage.

2. Apparatus as in claim 1 wherein the triangular members are folded flat for shipping.

* * * * *